Jan. 1, 1974  G. J. HAHN  3,783,061

METHOD OF SONIC WELDING OF PLASTICS

Filed March 24, 1970  2 Sheets-Sheet 1

INVENTOR
GRANVILLE J. HAHN

BY Sol B Wiegl
ATTORNEY

Jan. 1, 1974 G. J. HAHN 3,783,061
METHOD OF SONIC WELDING OF PLASTICS
Filed March 24, 1970 2 Sheets-Sheet 2

INVENTOR
GRANVILLE J. HAHN
BY Sol B. Wiczer
ATTORNEY

United States Patent Office 3,783,061
Patented Jan. 1, 1974

3,783,061
METHOD OF SONIC WELDING OF PLASTICS
Granville J. Hahn, Big Spring, Tex., assignor to Cosden Oil & Chemical Company, Big Spring, Tex.
Filed Mar. 24, 1970, Ser. No. 22,209
Int. Cl. B32b 31/20
U.S. Cl. 156—73                                    10 Claims

ABSTRACT OF THE DISCLOSURE

Plastic bodies are welded by using particles of thermoplastic material, melting at or about the plastic parts to be welded, distributed between the plastic surfaces to be welded, and then welding by applying ultrasonic vibrations impressed on one of the plastic bodies near the joint to be welded through a sound transferring resonating metal section termed a horn, which transfers intense ultrasonic vibrations to the plastic workpiece near the joint to be welded, the sound energy causing the particles to melt in the joint, bonding the surfaces together upon setting to form a firm weld.

---

This invention relates to method of ultrasonic welding of plastic materials. More particularly, it relates to the use of compatible thermoplastic polymer particles melting at or below the plastic substance of the surface to be joined in the weld and distributed between the mating surfaces to be welded by application of ultrasonic vibrations at a point near the mating surfaces separated by said particles to be joined, the sound being distributed through a sound transferring resonating metal section.

In prior art practices the plastic surfaces to be joined by welding needed first to have a special geometric designed surface, usually a tapering point disposed in one of the mating surfaces to be joined, such point lying against the opposing surface to be welded thereto, so that in the welding the tapering point through which the concentrated sound energy is directed to flow was the first point to melt and flow between the adjoining surfaces as welding plastic to bond surfaces into a welded joint. That expensive cutting of a tapering point design in at least one of the opposing parts to allow firm bonding is now rendered unnecessary by the present invention.

According to the present invention flat surfaces may now be joined together in a firm weld by merely introducing fine particulate compatible thermoplastic materials disposed between the surfaces to be welded as loose particles. After the particles are distributed between the surfaces to be joined, a sound applying tool is then impressed upon one of the surfaces of the plastic near the joint for the transfer of energy to the joint; and the particles become fused in the joint by the sound energy, forming a strongly-adherent molten film between the plastic surfaces, whereby they become firmly welded together. The welding material is particle sized in the range of about 300 to 20 U.S. Standard sieve. The particles are of the same plastic substance as the surfaces to be joined or are compatible therewith so that, upon melting, they will fuse into the adjoining surface materials to form a film weld. Such particles are thermoplastic at temperatures produced by the sound energy directed into the joint.

The present invention is a greatly simplified welding procedure, allowing great economy in the welding practice while producing good welds.

As known in the art, sonic welding is applicable to various plastic bodies; typically, polystyrene, copolymers of styrene and acrylonitrile and their rubber-modified impacts wherein the polymer has a small quantity from about 2% up to about 20% of rubber distributed therein, polycarbonate, polyvinylacetals, poly-lower alkylacryllic esters, poly-lower alkyl methacryllic esters wherein the lower alkyl has from 1 to 4 carbon atoms, usually methyl, nylon, polyethylene and polypropylene. Such polymers bond equally well, even when filled with strengthening fillers such as fiber glass.

The particulate bonding plastic is particles, as stated, of any thermoplastic substance compatible with the plastic material whose bodies are being bonded, and preferably of the same plastic substance as the plastic bodies being joined.

The invention is further shown in the drawings wherein.

Figure 1:
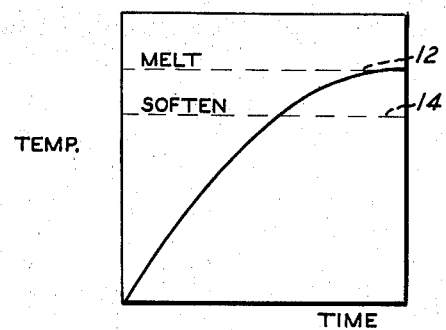
FIG. 1 illustrates graphically a time-temperature curve to fuse two thermoplastic bodies in sonic welding together in a firm bond.
Figure 3A:
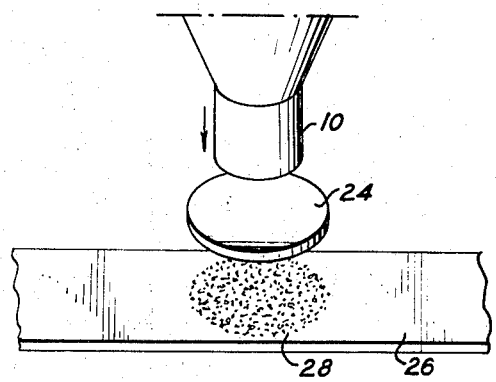
FIGS. 3a, 3b and 3c illustrate the consecutive steps of forming a weld according to Example I.

tool 10, as shown in FIG. 3a, to one of the surfaces to be representative of ultrasonically welding two flat polymer surfaces together by applying the flat end of the welding tool 10, as shown in FIG. 3a, to one of the surfaces to be welded together. Where these are merely plastic flat surfaces, there is a substantially long time delay between producing the temperature in the joint surface merely to soften the surface at point 14 of FIG. 1 and the time needed to increase the temperature to point 12 where the flat surface materials become molten and thereby capable of fusing together to complete the weld.

Figure 6A:
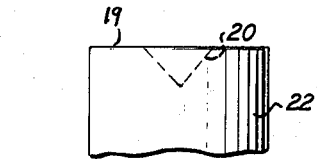
FIGS. 6a and 6b illustrate upper and lower joint sections to be welded in a butt weld according to typical prior art practice.
Figure 6B:
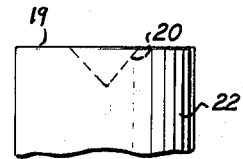

According to prior art practices as shown in FIGS. 6a and 6b, it is common, where the plastic body 16 has a flat surface 17 which is to be butt welded to the flat surface 19 of the plastic body 22, as shown in FIG. 6b, to form a tapered point or ridge 18 which is formed on the surface below the body 16. The body 16 is then brought into welding contact of its surface 17 with the surface 19 of a plastic body 22, so that upon application of sound energy the energy funnels through the tapered point 18 which quickly fuses into the adjoining surface of the body 22 for forming a weld. That type of weld is effected in a much shorter time, according to the curve of FIG. 2. It is sometimes useful in the practice of the art to cut a corresponding tapered depression 20 into the surface of the body 22, so that the tapered point 18 rests loosely within, but is supported by the bottom of depression 20. It is this structure upon welding, the tapered end 18, which tends to melt and flow into the depression 20 and even overflow between the adjoining surfaces of the bodies 16 and 22 for forming a firm bond, according to the prior practice.

Figure 2:
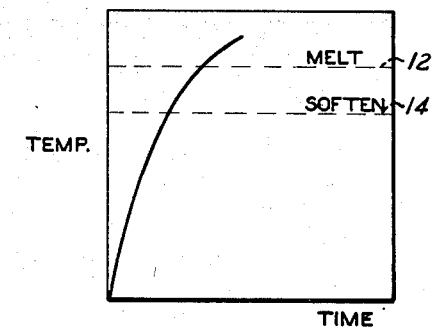
FIG. 2 is a similar time-temperature curve illustrating the great rapidity of sonic welding available where a sharp wedge is shaped upon one surface to be joined to another in a butt weld.

However, the forming of such tapered point energy director and depression is a time consuming and expensive mechanical operation whose need is obviated by the present invention. Moreover, the present method effects the welding just as rapidly as shown in FIG. 2 while embodying the great economy by which the need for the tapered joint construction in the joint to be welded is avoided.

Figure 3B:
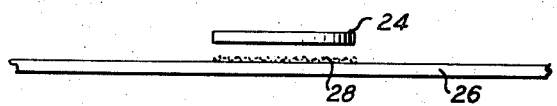

In practicing the present invention as illustrated in FIG. 3a, a plastic surface 26 which is to be welded to a cooperative plastic surface 24 is first dusted with fine particles of thermoplastic material. The surfaces are then brought together as shown in FIG. 3b so that the particles 28 lie loosely between the surfaces to be welded. In that position the welding tool 10 which is the end of a sounding horn as the device is known in the art, is firmly pressed against the surface 24 and ultrasonic waves are generated. These waves funnel from surface to surface through the loose particles so that the concentrated enegy first melts the particles which flow through the joint, firmly welding the adjoining surface of the polymer bodies 24 and 26 as shown in FIG. 3c.

It is not essential that the materials welded together be of the same plastic or even that the particles of plastic correspond to either of the plastic surfaces to be joined in the weld. It is only necessary that the polymer particles be compatible with it; that is, will form a firm surface bond with both surface materials to be welded. In the preferred selection of materials for welding, the particles are selected to homogeneously fuse into the surfaces being welded so that upon melting the particulate material will flow into or dissolve into the surfaces of the polymers being welded.

Figure 4A:
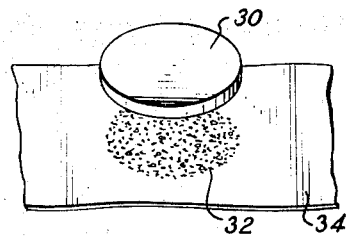
FIGS. 4a, 4b and 4c illustrate the consecutive steps for forming a weld according to Example II.

Thus, as shown in FIG. 4a, a thermoplastic polymer 30 such as high impact polystyrene which is styrene having about six percent of rubber particles dissolved therein, may be welded to a sheet material surface 34 such as cellulose butyrate using particles of crystal, i.e. pure polystyrene 32 as the welding particles. These particles may be in the form of fragments or beads of polystyrene in the particle size as stated above.

Figure 3C:

Upon welding a somewhat irregular weld results when the surface materials and particles are each different and the sheet 34 becomes bonded to the high impact polystyrene 30 by a heterogeneous fused material lying therebetween; but the styrene per se is sufficiently compatible to bond each surface material to form a good enough weld, even though inferior to that shown in FIG. 3c.

Figure 5A:
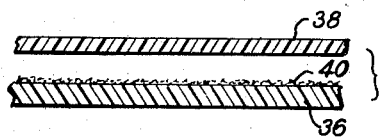
FIGS. 5a and 5b illustrate the consecutive steps of forming a weld according to Example IV.
Figure 5B:
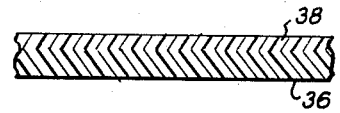

As shown in FIG. 5a, a thick sheet of acrylonitrile butadiene styrene copolymer 38 is welded to a similar sheet 36 using particles of the same polymer therebetween, and a firm weld as shown in FIG. 5b results. While it is most practical to use particles ranging in size from about 40 to 100 mesh, a wider range such as 20 to 300 mesh may be used. Any of the ultrasonic wave energy devices known in the welding of polymer may be used here. A typical horn frequency of 20,000 cycles is most commonly available. The fusion of the particles is effected for a period of about 0.8 to one second. Incomplete welds may result in application of the sound for a shorter period of time. Where the application of the sound is much prolonged, more extensive fusion of the polymer results, and the thermoplastic body may become distorted.

In general the particles should have some three dimensional aspects and may be rough ground particles. Beads of these many plastic substances formed by suspension polymerization of their monomers are a useful form and are usually preferred. The welding time would increase if the particles are sufficiently three dimensional to supply a series of vibration concentration points disposed between the surfaces to be welded.

The following examples illustrate the practice of this invention:

EXAMPLE I

High impact polystyrene particles are molded into a two inch diameter disc 24 as shown in FIGS. 3a and 3b and, utilizing another mold, into a bar-like shape 26 three quarter inch by eight inches. Polystyrene particles 28 having size distribution of a trace on 20 mesh, 0.4% on 30 mesh, 17.2% on 40 mesh, 39.5% on 60 mesh, 17.1% on 80 mesh, 6.7% on 100 mesh and 19.1% through 100 mesh U.S. Standard sieve, are applied in a sandwich fashion between the bar and the disc. These parts are laid out in a horizontal fashion on a support anvil (not shown) and then a horn-like device 10 of a commercial sonic welder is mounted over the parts and brought to bear on the disc part 24, pressing it upon the particles 28 into contact with the bar 26, using 35 p.s.i. air pressure. The horn-like device is caused to emit ultrasonic vibrations at a frequency of 20,000 cycles per second for a period of one second. On removal of the horn, it is found that the bar is firmly attached to the disc and the polystyrene particles 28 have fused and essentially become an integral part of the bar and the disc as shown in FIG. 3c.

EXAMPLE II

Figure 4B:
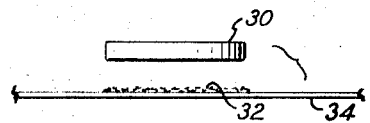
Figure 4C:
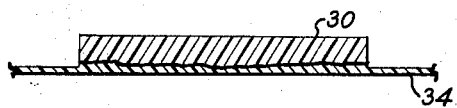

High impact polystyrene particles comprising polystyrene graft copolymerized with six weight percent of high cis transpolybutadiene rubber are molded into a two-inch diameter disc 30, as shown in FIGS. 4a and 4b. Polystyrene particles 32 as described in Example I are inserted between this disc 30 and a sheet of cellulose butyrate plastic 34 in a sandwich fashion as shown in FIG. 4b. The sandwich of plastic is ultrasonic welded as described in Example I and shown in FIG. 3a. Upon removal of the horn 10, it is found that the sheet 34 and the disc 30 are firmly attached as shown in FIG. 4c, although not as integrally attached as in the case of Example I and shown in FIG. 3c.

EXAMPLE III

Two polyethylene parts in the form of flat surfaces and being approximately one-eighth inch thick are made into a sandwich, utilizing polyethylene particles approximately 30 mesh in size between the two sheets in the same manner as that described in Example I and shown in FIGS. 3a and 3b. The ultrasonic welder is applied as in the case of Example I and upon removal of the horn it is found that the parts are attached and the two polyethylene sheets have essentially become one integral part as shown in FIG. 3c.

EXAMPLE IV

A 1.8-inch thick sheet 36 of ABS plastic as shown in FIG. 5a is covered with ABS particles 40, of approximately 40 mesh size U.S. Standard sieve and another one-eighth inch sheet 38 of ABS is laid over the particles to form a sandwich. The ultrasonic welder is applied for 0.8 second in a fashion similar to Example I. Upon removal of the horn 10 it is found that the sheets are firmly welded as shown in FIG. 5b. Attempts to break the weld by pulling the parts apart resulted in breaking the parts and the welded sheets could not be pulled apart.

What is claimed is:

1. The method of ultrasonic welding comprising assembling the bodies with flat surfaces to be welded together in superposed position with particles of a thermoplastic polymer compatible with each of the mating surfaces to be welded disposed between said surfaces, and applying sound waves in the ultrasonic range to the bodies to be welded at a point near the joint to be formed therebetween for a period of time sufficient to melt and cause said molten particles to flow between the surfaces and effect the welding together thereof upon cooling into a coherent body.

2. The method as defined in claim 1 wherein at least one of the surfaces to be joined is a thermoplastic body in which the molten particles dissolve.

3. The method as defined in claim 1 wherein both surfaces to be joined are thermoplastic and the molten particles intermix with the thermoplastic surface material of said bodies to effect a firm welded joint therebetween.

4. The method as defined in claim 1 wherein each of the surfaces of said bodies are thermoplastic of different polymeric substance to be welded, and the molten particles are soluble in both surfaces.

5. The method as defined in claim 1 wherein both surfaces to be welded are of the same thermoplastic substance and the particles are thermoplastic of a different polymeric substance melting at or slightly below the melting points of the surface materials to be joined.

6. The method as defined in claim 1 wherein the surface materials to be welded together and the particles are of the same thermoplastic substance.

7. The method as defined in claim 1 wherein the particles are sized in the range of 20 to 300 U.S. Standard sieve.

8. The method as defined in claim 2 wherein the particles are sized in the range of 20 to 300 U.S. Standard sieve.

9. The method aas defined in claim 6 wherein the particles are sized in the range of 20 to 300 U.S. Standard sieve.

10. The method as defined in claim 6 wherein the particles are beads sized in the range of about 40 to 100 U.S. Standard sieve.

References Cited

UNITED STATES PATENTS

| 3,480,492 | 11/1969 | Hauser | 156—73 |
| 3,445,307 | 5/1969 | Balamurth | 156—73 |
| 2,731,573 | 1/1956 | Hansen | 156—73 |
| 3,284,257 | 11/1966 | Scloff | 156—73 |

FOREIGN PATENTS

| 1,018,370 | 1/1966 | Great Britain | 156—73 |

BENJAMIN A. BORCHELT, Primary Examiner

J. V. DORAMUS, Assistant Examiner